United States Patent
Ashby et al.

(10) Patent No.: US 7,407,093 B2
(45) Date of Patent: Aug. 5, 2008

(54) SYSTEM, METHOD, AND COMPUTER PROGRAM PRODUCT FOR PACKAGING AND ACTIVATING STORED VALUE CARDS

(75) Inventors: David A. Ashby, Draper, UT (US); Randall G. Beck, Alpine, UT (US); Nick C. Harris, Haymarket, VA (US); Gail E. Larsen, South Jordan, UT (US); Andrew R. Plitt, Riverton, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 296 days.

(21) Appl. No.: 11/239,339

(22) Filed: Sep. 30, 2005

(65) Prior Publication Data
US 2006/0273153 A1 Dec. 7, 2006

Related U.S. Application Data

(60) Provisional application No. 60/687,862, filed on Jun. 7, 2005.

(51) Int. Cl.
*G06K 5/00* (2006.01)

(52) U.S. Cl. .................................. 235/380; 235/381

(58) Field of Classification Search ............... 235/380, 235/381, 375, 493, 486, 487, 488, 462.01, 235/462.25; 379/114.2
See application file for complete search history.

(56) References Cited

U.S. PATENT DOCUMENTS

| | | | |
|---|---|---|---|
| 2,165,539 A | 7/1939 | Dahlgren | |
| D259,024 S | 4/1981 | Roccaforte et al. | |
| D340,861 S | 11/1993 | Abelson | |
| D344,675 S | 3/1994 | Jacobson | |
| 5,760,381 A * | 6/1998 | Stich et al. | 235/380 |
| 5,777,305 A * | 7/1998 | Smith et al. | 235/380 |
| 5,791,474 A | 8/1998 | Hansen | |
| D410,769 S | 6/1999 | Dorizas | |
| 5,918,909 A | 7/1999 | Fiala et al. | |
| 6,109,439 A | 8/2000 | Goade, Sr. | |
| 6,145,665 A | 11/2000 | Krahn | |
| 6,209,292 B1 | 4/2001 | Krahn | |
| 6,224,108 B1 | 5/2001 | Klure | |
| 6,270,012 B1 * | 8/2001 | Dawson | 235/381 |
| 6,315,206 B1 * | 11/2001 | Hansen et al. | 235/487 |
| D452,147 S | 12/2001 | Patel et al. | |
| 6,328,341 B2 | 12/2001 | Klure | |
| 6,439,613 B2 * | 8/2002 | Klure | 283/62 |
| 6,454,165 B1 * | 9/2002 | Dawson | 235/381 |
| 6,473,500 B1 | 10/2002 | Risafi et al. | |
| D468,198 S | 1/2003 | Nakazawa et al. | |
| 6,543,809 B1 | 4/2003 | Kistner et al. | |

(Continued)

*Primary Examiner*—Thien M Le
(74) *Attorney, Agent, or Firm*—Sterne, Kessler, Goldstein & Fox P.L.L.C.

(57) ABSTRACT

A system, method, and computer program product are used for packaging a stored value card that unviewably secures the secured value card in the package. The package includes a readable area allowing for purchasing of the stored value card without removing it from the package or viewing it within the package. This can allow for minimized fraud and illegal use of stored value cards. In one example, the package is scanned for purchasing, and once the purchase in approved, the purchaser can activate the card.

22 Claims, 11 Drawing Sheets

U.S. PATENT DOCUMENTS

| | | |
|---|---|---|
| D475,918 S | 6/2003 | Ajootian |
| 6,588,658 B1 | 7/2003 | Blank |
| 6,612,487 B2 | 9/2003 | Tidball et al. |
| 6,619,480 B2 | 9/2003 | Smith |
| 6,715,795 B2 | 4/2004 | Klure |
| D490,104 S | 5/2004 | Lubking |
| 6,779,666 B2 | 8/2004 | Collins |
| D498,788 S | 11/2004 | Lubking |
| 6,820,803 B1 | 11/2004 | Browning et al. |
| 6,829,596 B1 | 12/2004 | Frazee |
| 6,832,720 B2 * | 12/2004 | Dawson ...................... 235/381 |
| 6,837,426 B2 | 1/2005 | Tidball et al. |
| 6,945,398 B2 | 9/2005 | Shumake et al. |
| 7,055,740 B1 * | 6/2006 | Schultz et al. .............. 235/381 |
| 7,234,638 B2 * | 6/2007 | Lee et al. .................... 235/380 |
| 7,252,225 B2 * | 8/2007 | Schultz et al. .............. 235/380 |
| 2002/0100797 A1 | 8/2002 | Hollingsworth et al. |
| 2003/0057274 A1 * | 3/2003 | Dawson ...................... 235/380 |
| 2005/0205663 A1 * | 9/2005 | Algiene ...................... 235/380 |
| 2005/0279825 A1 | 12/2005 | Ashby et al. |

\* cited by examiner

SYSTEM, METHOD, AND COMPUTER PROGRAM PRODUCT FOR PACKAGING AND ACTIVATING STORED VALUE CARDS

CROSS REFERENCE TO RELATED APPLICATIONS

This application claims priority under 35 U.S.C. §119(e) to U.S. Provisional Patent Application No. 60/687,862, filed Jun. 7, 2005, which is incorporated by reference herein in its entirety.

BACKGROUND

1. Field of the Invention

The present invention generally relates to packaging and activating stored value cards.

2. Related Art

Stored value cards have increasingly become a card of choice for gift givers, whether they are for personal or business reasons. In point-of-sale (POS) cases, all or a portion of the card is usually visible after being secured in or secured to the packaging. Typically, the viewable portion of the card is used during the purchase and activation of the card. However, having this information visible to the public can allow for illegal or fraudulent use of the information. This is especially true of open system cards that can be used anywhere in the world. Typically these cards are activated upon purchase.

While this is secure for most cases, in some cases this also can allow for fraudulent use of the stored value card. A description of debit and other stored value cards, typical packaging and activation techniques can be found in U.S. Pat. No. 5,760,381 issued to Stich et al., which is hereby incorporated by reference in its entirety.

Given the foregoing, what is needed is a system, method and computer program product for packaging and activating stored value cards, which keeps them unviewably secured within the package.

BRIEF DESCRIPTION

The present invention meets the above-identified needs by providing a system, method and computer program product for unviewably securing a stored value card within a package and for an activation method to activate the same.

One aspect of the present invention provides a method comprising the following steps: reading information on a package during purchase of a stored value card using a purchasing system, the information being associated with the stored value card, and the stored value card being unviewably secured within the package, initiating communications between the purchasing system and a host system that is associated with the stored value card, verifying authenticity of the stored value card, and completing the purchase. Activating the stored value card after a purchase of the stored value card can be completed through either reading of the stored value card during a purchase transaction or through using a purchaser system.

Another aspect of the present invention provides a system comprising a package, a purchasing system, a host system, a comparing device, and an activation device. The package unviewably secures a stored value card and includes an information area thereon that includes readable information associated with the stored value card. The purchasing system reads (or receives input of) the readable information and transmits it to the host system. The host system receives the readable information from the purchasing system. The comparing device compares the readable information to stored information stored in the host system and generates a result. The purchasing system controls a purchase transaction of the package based on the result generated by the comparing device. The activation device activates the stored value card only after the purchasing system has completed the purchase transaction.

In a further aspect, the present invention provides a computer program product comprising a computer useable medium having a computer program logic recorded thereon for controlling at least one processor, the computer program logic is comprised of computer program code devices that perform operations similar to the devices in the above embodiment.

Further features and advantages of the present invention as well as the structure and operation of various embodiments of the present invention are described in detail below with reference to the accompanying drawings.

BRIEF DESCRIPTION OF THE DRAWINGS

The features of the present invention will become more apparent from the detailed description set forth below when taken in conjunction with the drawings. The left-most digit of a reference number identifies the drawing in which the reference number first appears.

DETAILED DESCRIPTION

Overview and Terminology

Figure 1:
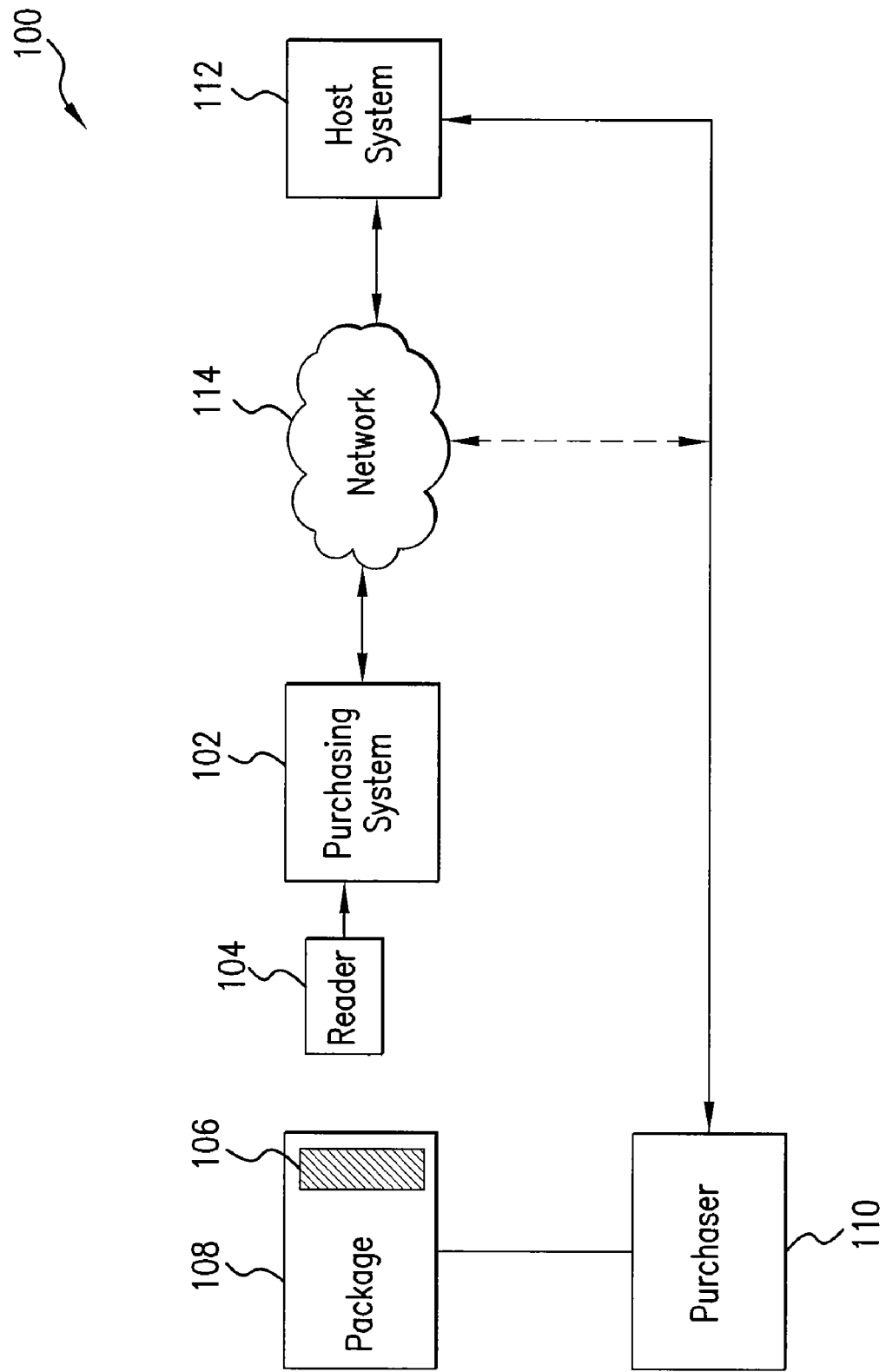
FIG. 1 is a diagram of a system that incorporates the present invention.

The present invention is directed to a system, method and computer program product for packaging a stored value card that unviewably secures a stored value card in a package, and for activating the same. The package includes a readable area allowing for purchase of the stored value card without requiring removal from the package or requiring that it be visible within the package. This can help prevent fraud and illegal use of stored value cards. In one example, the package is scanned for purchasing. Once the purchase is approved, the purchaser can then call, for example, a toll-free telephone number to activate the card.

The present invention is now described in more detail herein in terms of the above exemplary description. This is for convenience only and is not intended to limit the application of the present invention. In fact, after reading the following description, it will be apparent to one skilled in the relevant art(s) how to implement the following invention in alternative embodiments.

The terms "purchaser," "user," "end user", "consumer", "customer," "participant," etc., and/or the plural form of these terms are used interchangeably throughout this description to refer to those persons or entities capable of accessing, using, being affected by and/or benefiting from the tool that the present invention provides for packaging and activating a stored value card.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

Financial transaction instruments may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

Open Versus Closed Cards

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

Stored Value Cards

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments up to ten dollars.

Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user.

The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

Account and Merchant Numbers

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$N_1N_2N_3N_4\ N_5N_6N_7N_8\ N_9N_{10}N_{11}N_{12}\ N_{13}N_{14}N_{15}N_{16}$

The first five to seven digits are reserved for processing purposes and identify the issuing institution, card type, etc. In this example, the last (sixteenth) digit is typically used as a sum check for the sixteen-digit number.

The intermediary eight-to-ten digits are used to uniquely identify the customer, card holder or cardmember.

A merchant account number may be, for example, any number or alpha-numeric characters that identifies a particular merchant for purposes of card acceptance, account reconciliation, reporting and the like.

RFID and Transmission of Magnetic Stripe Data

It should be noted that the transfer of information in accordance with the present invention may be done in a format recognizable by a merchant system or account issuer. In that regard, by way of example, the information may be transmitted from an RFID device to an RFID reader, or from the RFID reader to the merchant system in magnetic stripe or multi-track magnetic stripe format.

Because of the proliferation of devices using magnetic stripe format, the standards for coding information in magnetic stripe format were standardized by the International Organization for Standardization in ISO/IEC 7811-n (characteristics for identification cards) which are incorporated herein by reference. The ISO/IEC 7811 standards specify the conditions for conformance, physical characteristics for the card (warpage and surface distortions) and the magnetic stripe area (location, height and surface profile, roughness, adhesion, wear and resistance to chemicals), the signal amplitude performance characteristics of the magnetic stripe, the encoding specification including technique (MFM), angle of recording, bit density, flux transition spacing variation and signal amplitude, the data structure including track format, use of error correction techniques, user data capacity for ID-1, ID-2 and ID-3 size cards, and decoding techniques, and the location of encoded tracks.

Typically, magnetic stripe information is formatted in three tracks.

Certain industry information must be maintained on certain portion of the tracks, while other portions of the tracks may have open data fields. The contents of each track and the formatting of the information provided to each track is controlled by the ISO/IEC 7811 standard. For example, the information must typically be encoded in binary. Track 1 is usually encoded with user information (i.e., name) in alphanumeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, current units amount authorized per cycle, subsidiary accounts, and restrictions.

As such, where information is provided in accordance with the present invention, it may be provided in magnetic stripe track format. For example, the counter values, authentication tags and encrypted identifiers, described herein, may be forwarded encoded in all or a portion of a data stream representing data encoded in, for example, track 2 or track 3 format.

System Overview

FIG. 1 shows a system 100 that includes features of the present invention. For example, system 100 can be used to purchase and later activate stored value cards from a retailer, business, or merchant. A purchasing system 102 is coupled to a reader 104 that reads readable information 106 on a package 108 holding therein one or more stored value cards (not shown) being purchased by a purchaser 110. Purchasing system 102 is coupled to a host system 112 via a network 114. For example, network 114 can be, but is not limited to, a wired or wireless connection over an intranet or internet (e.g., the global Internet), an issuer/credit network or the like.

Throughout this description it is to be understood that the use of a stored value card or one or more stored value cards are meant to encompass the use of any number of stored value cards. Thus, in at least one embodiment only one stored value card is secured in a package, purchased, and activated using the systems and method described below. In another embodiment, more than one stored value cards can be secured in a package, purchased, and activated using the systems and method described below.

In one example when a purchaser 110 activates the stored value card after the purchase transaction is completed, purchaser 110 is coupled to host system 112 either directly or via network 114. For instance, a telephone communications system can be used when purchaser 110 is coupled directly to host system 112.

Exemplary Packages

Figure 2:
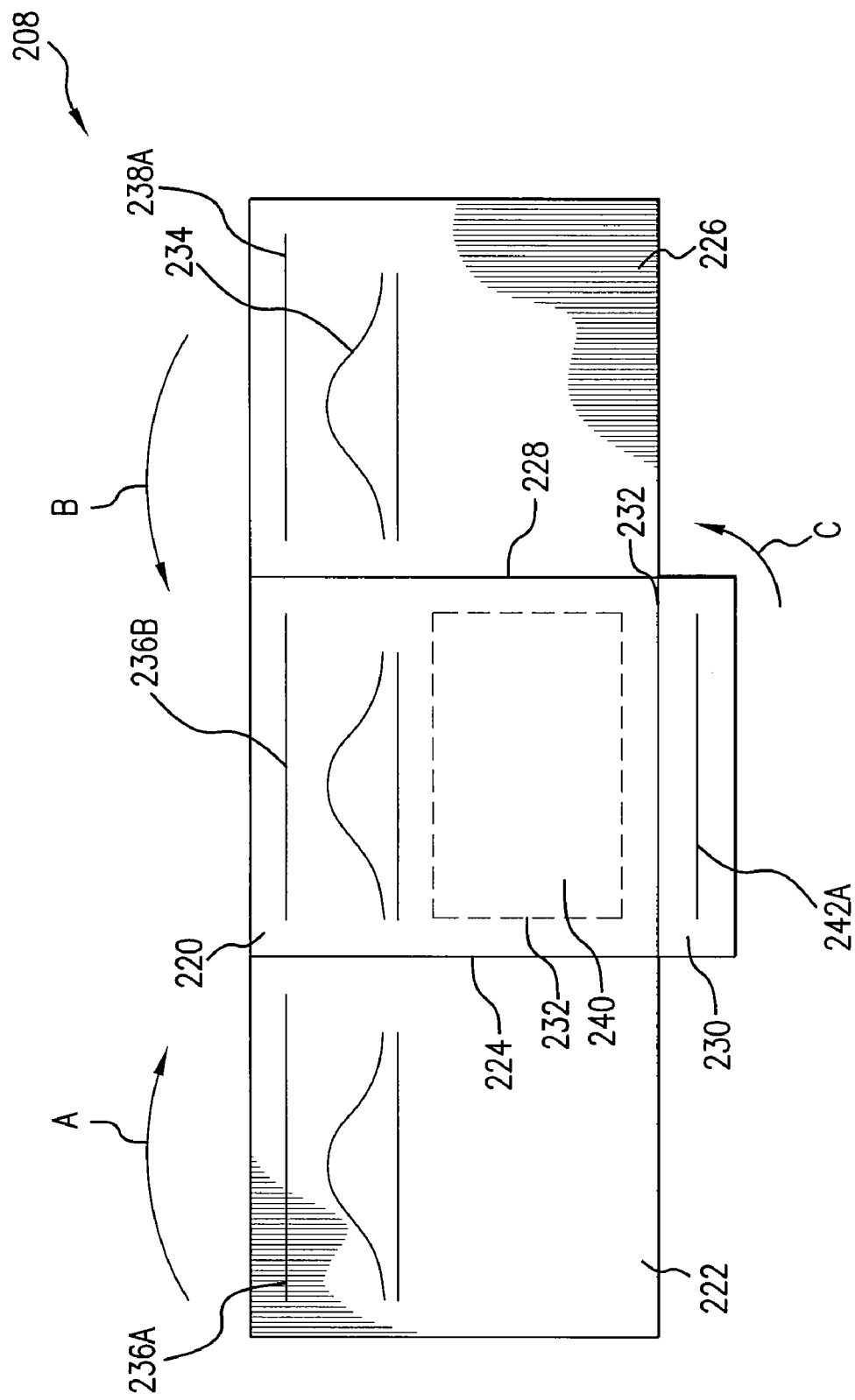
FIGS. 2, 3, 4, and 5 show packaging arrangements, according to various embodiments of the present invention.

FIG. 2 shows an unfolded state of a package 208, according to one embodiment of the present invention. Package 208 includes a body 220 coupled to a first panel 222 along a first edge 224, a second panel 226 along a second edge 228, and a third panel 230 along a third edge 232. Optionally, body 220 and first, second, and third panels 222, 226, and 230, respectively, can have an opening 234 that can be used to hang package 208 in a retail establishment display as will be appreciated by those skilled in the relevant art(s) after reading the description herein.

In order to form a completed package 208, the following steps are taken. First panel 222 is folded along first edge 224 in the direction of arrow A, and coupled to body 220 using coupling devices 236A and 236B (e.g., an adhesive strip, or the like). Then, second panel 226 is folded along second edge 228 in the direction of arrow B, and coupled to first panel 222 using coupling device 238A (e.g., an adhesive strip, or the like) that couples to a similarly situated coupling device (not shown) located on the opposite face (or backside) of first panel 222 to that shown in FIG. 2. A stored value card 240 is either inserted into a receiving area now formed in package 208 or coupled to one of body 220 or first panel 222 before the folding process begins. Finally, third panel 230 is folded along third edge 232 in the direction of arrow C, and coupled to second panel 226 using coupling device 242A (e.g., adhesive, or the like) that couples to a similarly situated coupling device (not shown) on the backside of second panel 226.

It is to be appreciated that the coupling devices (e.g., adhesive) may only be located on one panel and are not required on both panels being coupled together.

Figure 3:
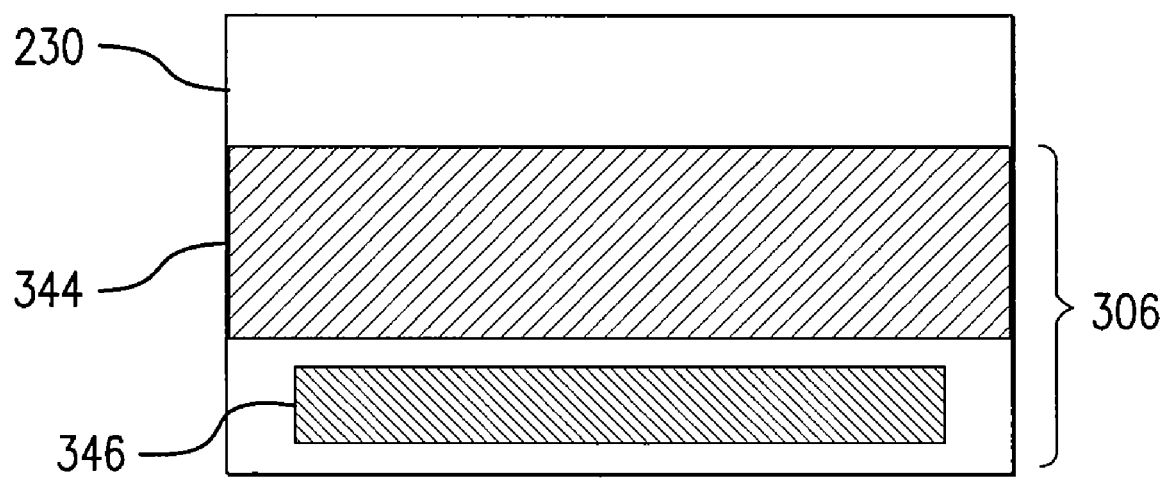

FIG. 3 shows a side of third panel 230 opposite the side of third panel 230 shown in FIG. 2, according to one embodiment of the present invention. The side of third panel 230 shown in FIG. 3 includes information area 306 including one or more of a magnetic stripe 344 and a machine readable code 346. For example, machine readable code can be a UPC code, a bar code, or the like. Information area 306 is used for a purchasing transaction of stored value card 240 (FIG. 2), as is described in more detail below. Through use of this packaging assembly, stored value card 240 (FIG. 2) is unviewably secured within package 208 while package 208 is displayed in a retail or merchant's establishment. Only the information area 306 on the outside of package 208 is visible to a consumer.

In one example, stored value card 240 includes an account number, an expiration date, and a magnetic strip. Information stored in information area 306 is associated with the account number and expiration date. For example, information in information area 306 can include a serial number of stored value card 240. This serial number is stored in host system 112 (FIG. 1) in a look-up table that links a serial number of stored value card 240 to an account number of stored value card 240, which is used during activation of stored value card 240. In this example, and other examples discussed above and below, host system 112 can be a single computer or a network of related or third party computers.

In various examples, stored value card 240 can be an open system card or a closed system card.

Figure 4:
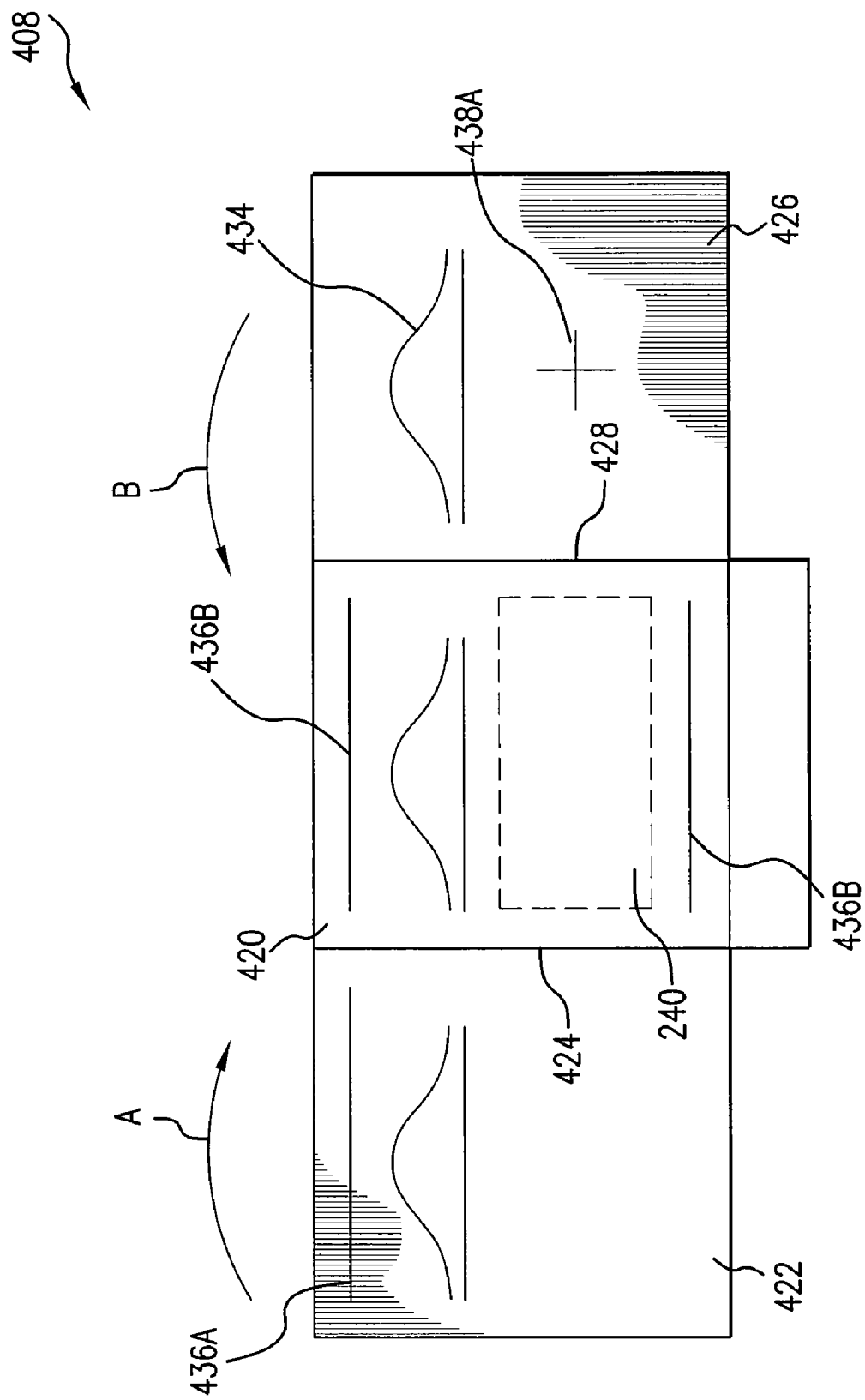
Figure 5:
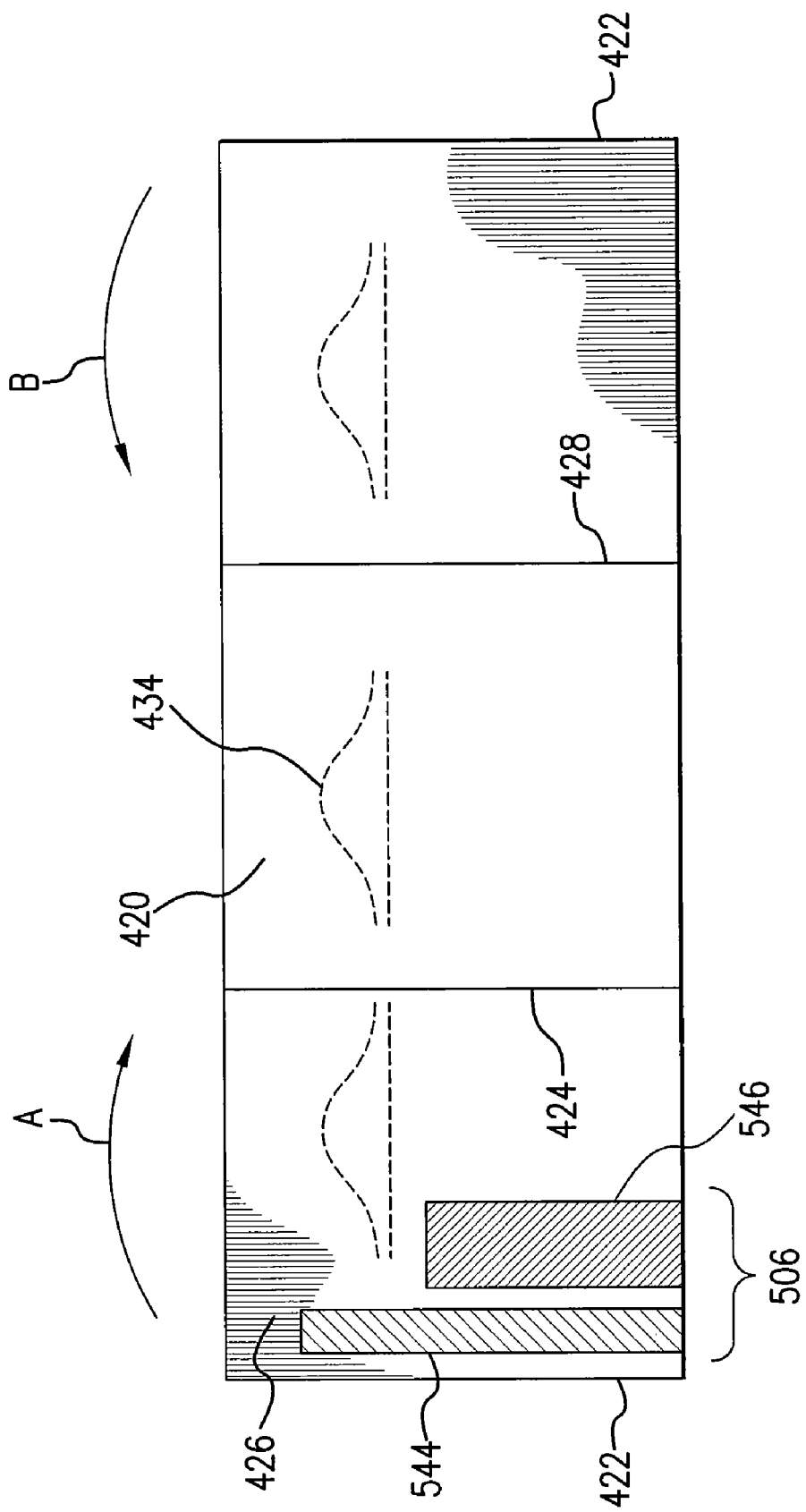

FIGS. 4 and 5 show first and second sides, respectively, of an unfolded state of a package 408, according to another embodiment of the present invention. Package 408 includes a body 420 coupled to a first panel 422 along a first edge 424 and coupled to a second panel 426 along a second edge 428. Optionally, body 420 and first and second panels 422 and 426, respectively, can have an opening 434 that can be used to hang package 408 in a retail establishment (e.g., as part of a display).

In order to complete formation of package 408, the following steps are taken. First panel 422 is folded along first edge 424 in the direction of arrow A, and coupled to body 420 using coupling devices 436A and 436B (e.g., adhesive, or the like). Stored value card 240 is either inserted into a receiving area now formed in package 408 or coupled to one of body 420 or first panel 422 before the folding process begins. Then, second panel 426 is folded along second edge 428 in the direction of arrow B, and coupled to first panel 422 using coupling device 438A (e.g., adhesive, or the like) that is coupled to a similarly situated coupling device (not shown) on the backside of first panel 422.

It is to be appreciated that packages 208 and 408 can be coupled in other areas than where coupling devices are shown in FIGS. 2 and 4, where these are merely exemplary locations for coupling devices.

Figure 10:
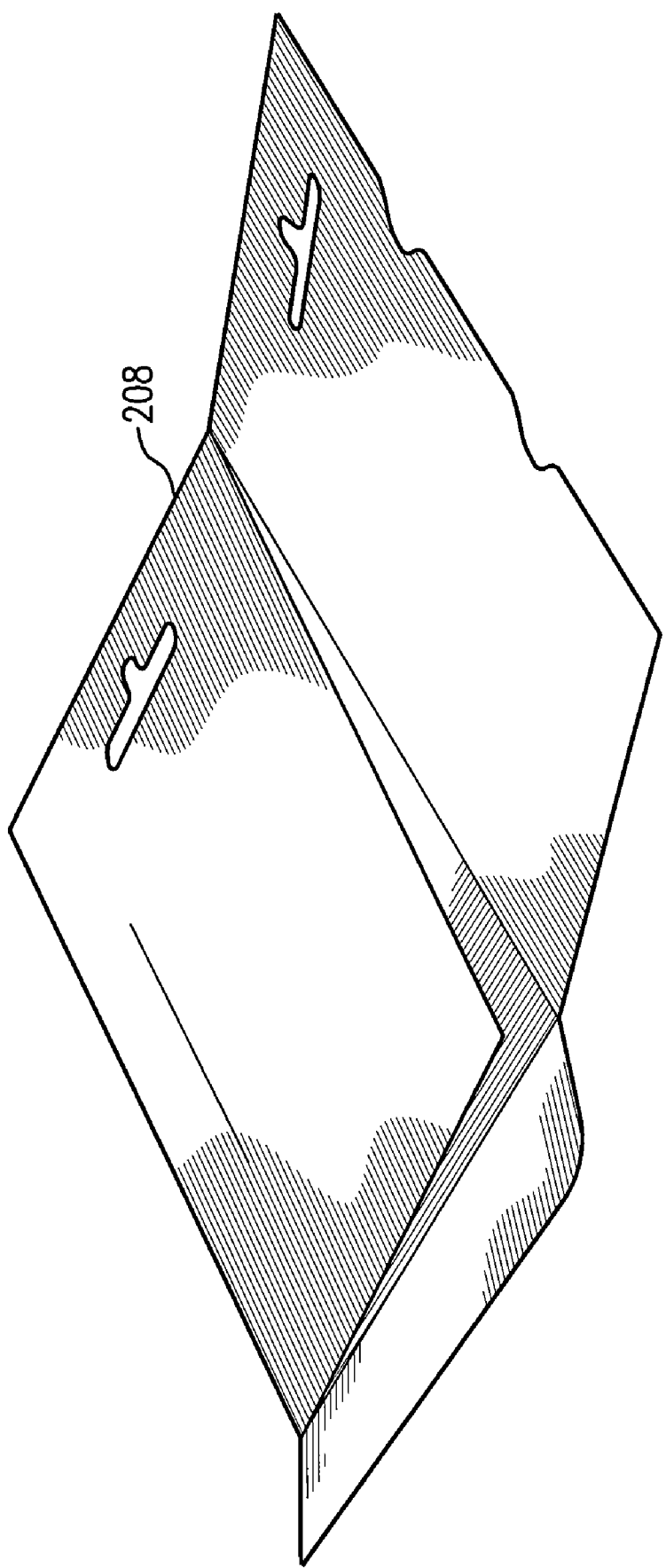
FIG. 10 shows a partially assembled view of the package shown in FIGS. 2 and 3.
Figure 11:
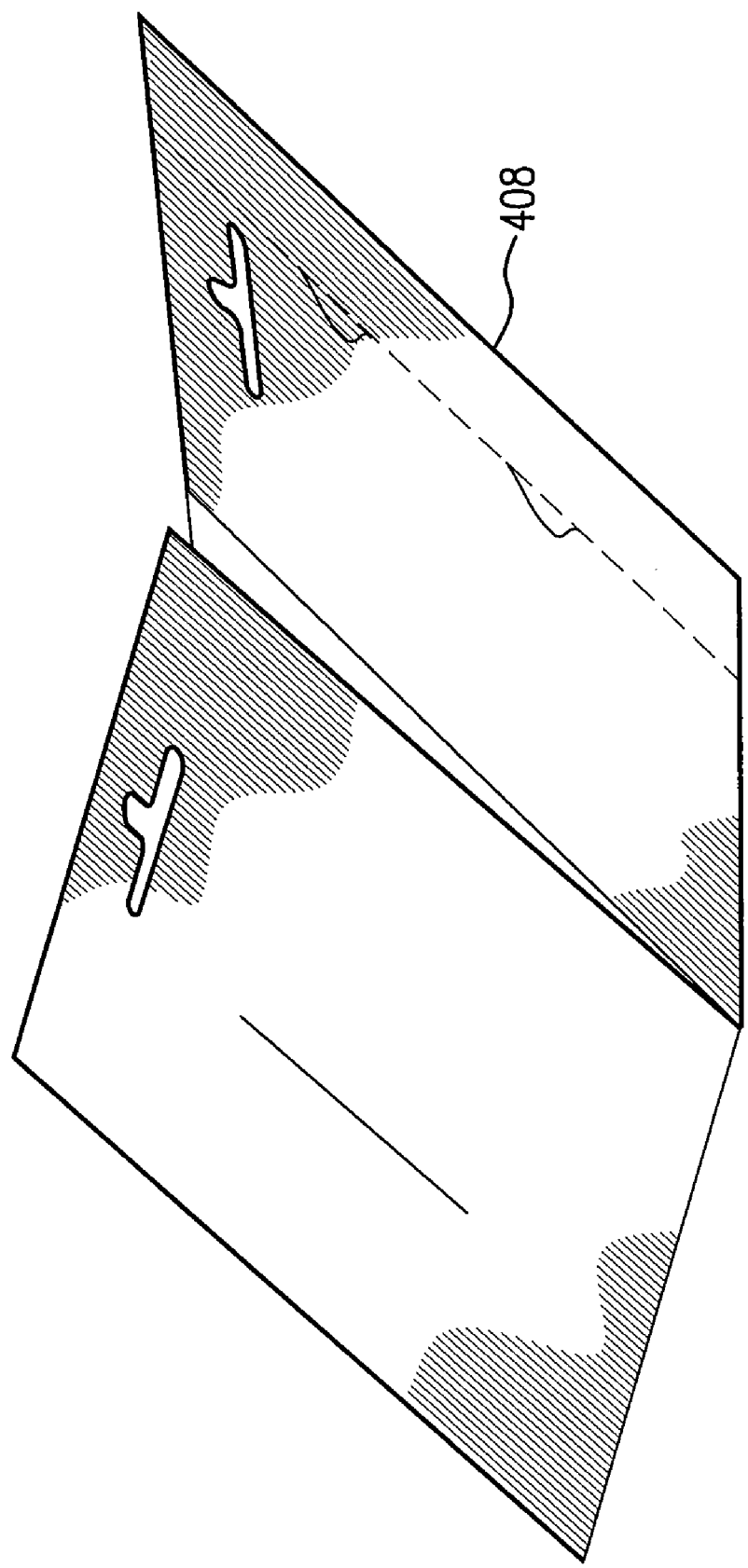
FIG. 11 shows a partially assembled view of the package shown in FIGS. 4 and 5.

FIG. 10 shows a partially assembled view of the package shown in FIGS. 2 and 3. FIG. 11 shows a partially assembled view of the package shown in FIGS. 4 and 5. A main difference between packages 208 and 408 is the configuration of the next-to-final and final assembled package, as is best seen in FIGS. 10 and 11.

For the example shown in FIGS. 2, 3, and 10, package 208 is configured to have a bottom opening where a card is inserted before final assembly, and third panel 230 (FIGS. 2 and 3) completes the construction of package 208. Also, in package 208, as best seen in FIG. 3, the information area 306 is located on third panel 230.

For the example shown in FIGS. 4, 5, and 11, package 408 is configured to have a side opening where a card is inserted before final assembly, and second panel 426 (FIG. 4) completes the construction of package 408. Also, in package 408, as best seen in FIG. 5, information area 506 is located on second panel 426.

FIG. 5 shows the side of second panel 426 opposite the side shown in FIG. 4. This side of second panel 426 shown in FIG. 5 includes information area 506 including one or more of a magnetic stripe 544 and a machine readable code 546. For example, machine readable code can be a UPC code, a bar code, or the like. Information area 506 is used for a purchasing transaction of stored value card 240 (FIG. 2), as is described in more detail below. Through use of this packaging assembly, stored value card 240 (FIG. 2) is unviewably secured within package 408, while package 408 is displayed in a retail establishment. Only the information area 506 on the outside of package 408 is visible to a consumer. It is to be appreciated that information area 506 can also be located on the side of body 422 shown in FIG. 5 without departing from the scope of the present invention.

In one example, the packages described above can include graphics and/or text including a denomination of stored value card 240, or any other information that a consumer might need to purchase, activate, and/or use stored value card 240. For example, information can allow for giving stored value card 240 as a gift for a birthday or anniversary, or any other occasion, by printing these words, or space for these words to be filled in, right on package 108, 208, or 408. Thus, a separate card or wrapping would be unnecessary.

It is to be appreciated that multiple entities can be involved in the manufacture of the card, the manufacturing of the package, the setting-up of the card (e.g., adding and associating serial numbers, account numbers, payees, expiration dates, etc.), the distributing, selling, and/or activating of the cards.

It is to be appreciated that, although magnetic stripe 344 and/or 544 are shown running in a particular direction, they can also run in any other direction desired, e.g., widthwise or lengthwise.

In one example, a magnetic stripe on a package contains only limited information regarding a stored value card held by the package. This information may only relate to the serial number of the stored value card. In contrast, a magnetic stripe on the stored value card itself can contain, for example, but is not limited to, one or more of a serial number, an account number, a denomination or stored value, an expiration date, or the like.

Exemplary Operation Processes

Figure 6:
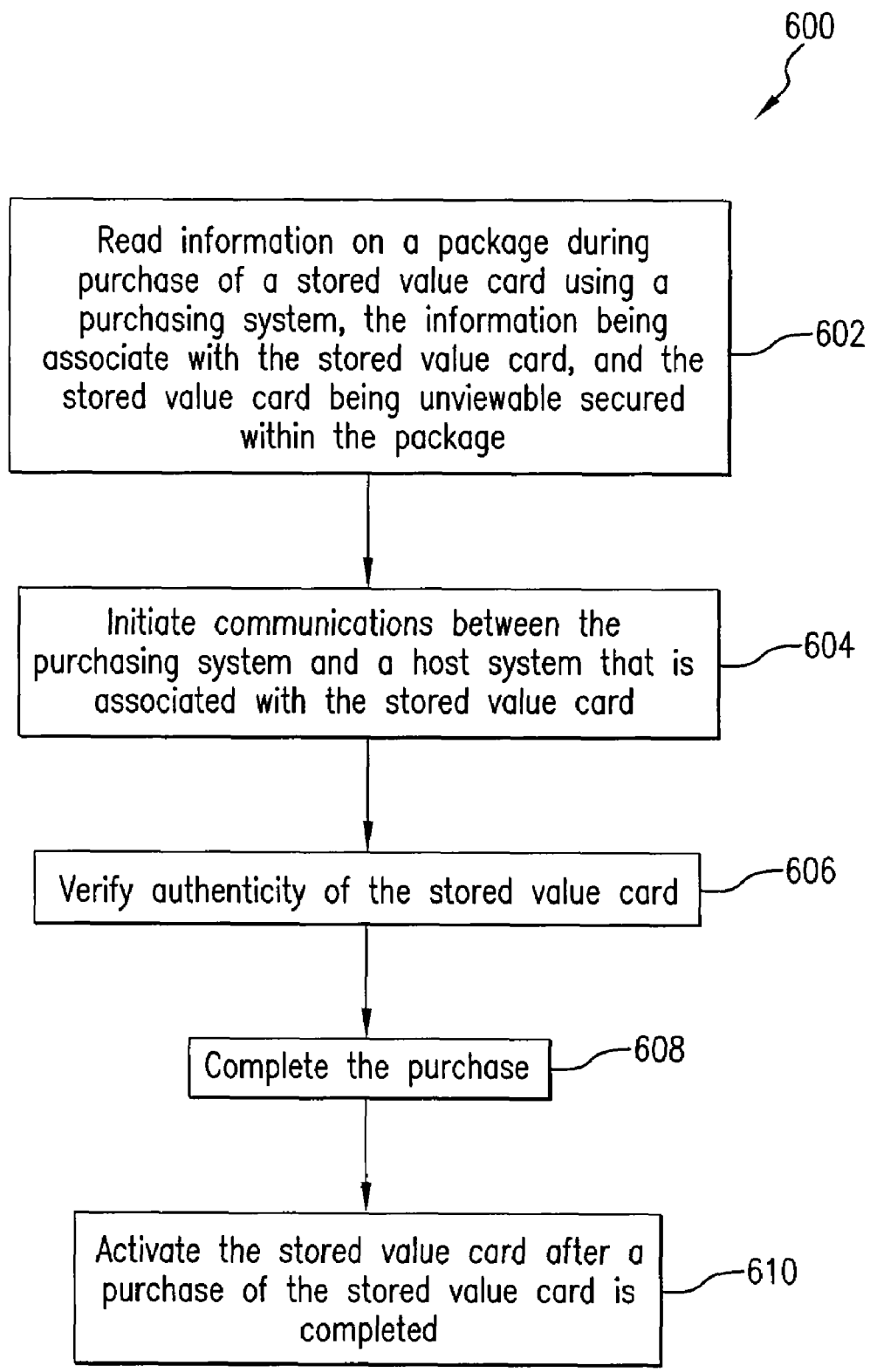
FIGS. 6, 7, and 8 are flowcharts showing various methods, according to various embodiments of the present invention.

FIG. 6 shows a flowchart depicting a verification and activation process 600, according to one embodiment of the present invention. For example, process 600 can be performed using system 100 and packages 108, 208, or 407 discussed above. In step 602, information on a package is read during purchasing of a stored value card using a purchasing system. The information is associated with the stored value card. Also, the stored value card is unviewably secured within the package. In step 604, communications are initiated between the purchasing system and a host system (e.g., a card issuer system or a third party system) that is associated with the stored value card. In step 606, authenticity of the stored value card is verified. In step 608, the purchase is completed.

In one example, periodic data transfer is performed between the host system and a card issuer system. This is done if the host system is not the card issuer system, but is rather a third party system. This periodic transfer can occur hourly, daily, weekly, etc.

In step 610, the stored value card is activated. In an example where the data transfer has occurred, if necessary, the activation can occur through reading of an information area of the stored value card, such as a magnetic strip on the stored value card, during a first purchase transaction after purchasing the stored value card.

In another example, activation can be done through using a purchaser system after a purchase of the stored value card is completed. For example, activation can be performed by the purchaser using a purchaser or other communication system (e.g., a telephone or telephone system) in order to contact the host system. In one example, this is performed by the purchaser calling a toll free (e.g., 1-800, 1-888, etc.) number in order to activate the stored value card. This may be performed, for example, if the stored value card is used in a transaction before the above described data transfer has occurred.

Figure 7:
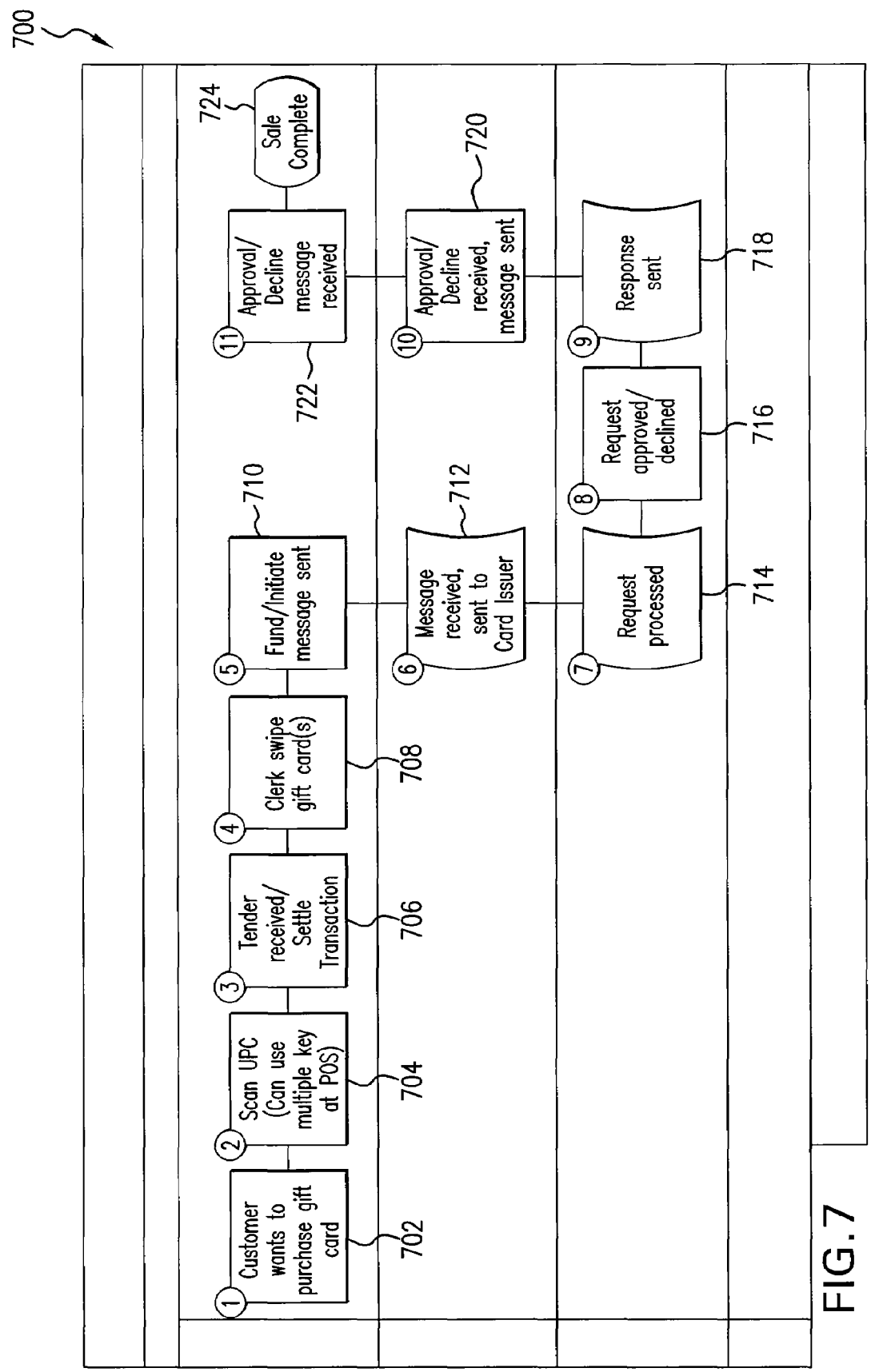
Figure 8:
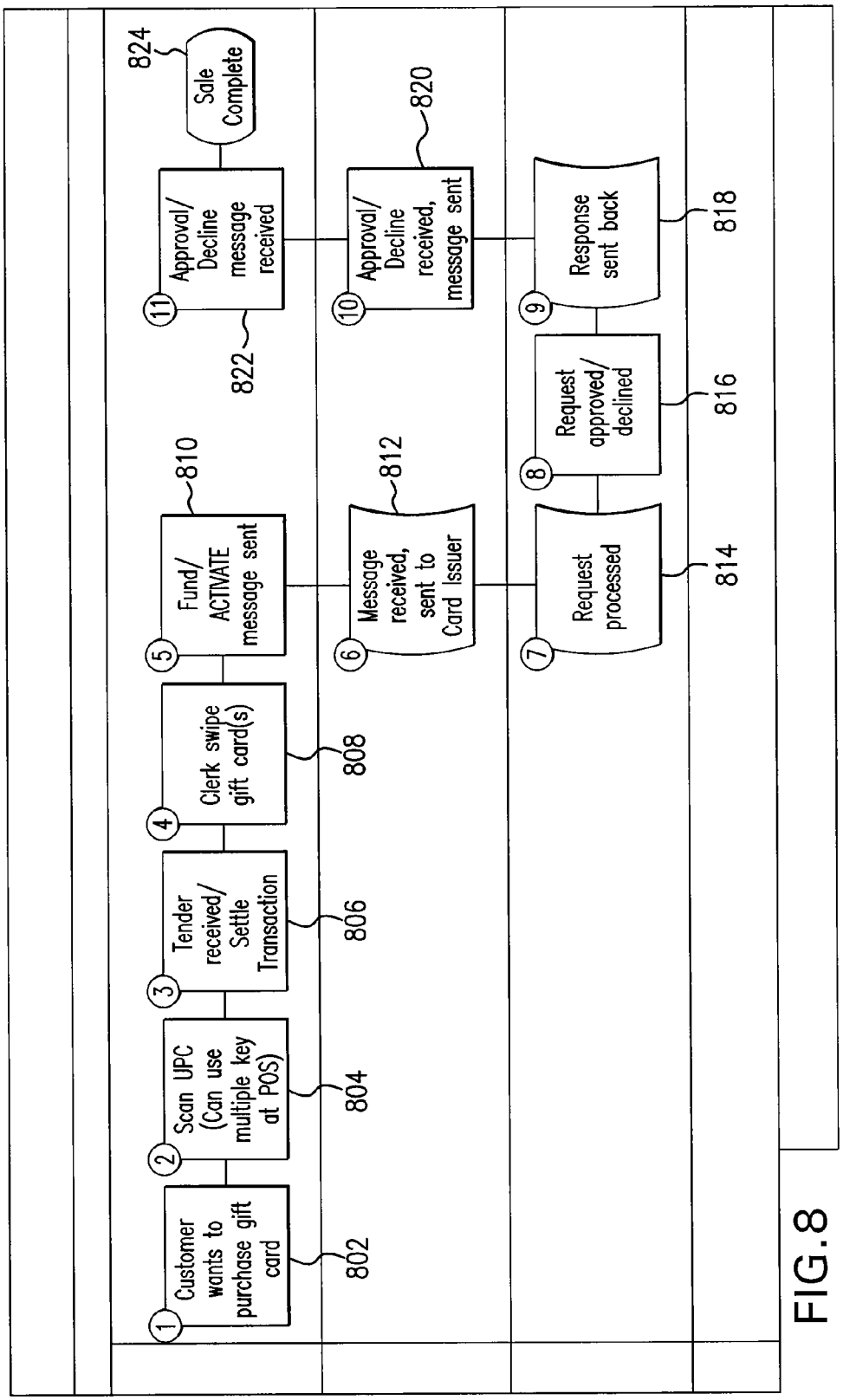

In one example, the steps shown as being performed in different rows in FIG. 7 and FIG. 8 can be performed at different locations and/or by different systems (e.g., some steps may be performed by third party systems). Thus, when performed by a same system and/or at a same location, some similar and/or subsequent steps (e.g., sending messages two times, receiving messages two times, etc) may not be needed, as would be apparent to a skilled artisan upon reading this description.

FIG. 7 shows a flowchart depicting a verification and activation process 700, according to another embodiment of the present invention. For example, process 700 can be performed using system 100 and a package 108, as described above. In step 702, a customer wants to purchase a stored value card (e.g., a gift card). In step 704, a UPC on a package holding the gift card is scanned at the point-of-sale (POS). In step 706, a customer pays for the gift card. In step 708, a magnetic stripe on the package holding the gift card is swiped. In step 710, a message is sent from a purchasing system to a (typically remote) host system (e.g., American Express or a third party) asking to fund and initiate the gift card located inside the swiped package. In step 712, the message is received by the host system. In step 714, the request to fund the gift card is processed. In step 716, the request is approved or declined. Once approved, the card can be later activated by the purchaser by either using the stored value card in a purchase transaction or by a call to a 1-800 number. In step 718, a response regarding approval or denial is sent from the host system to the purchasing system. In step 720, the approval/denial message is sent to the purchasing system. In step 722, the approval/denial message is received at the purchasing system (e.g., the POS).

In step 724, both the actual purchase is considered complete and the sale activation is considered complete. The activation can be accomplished in various ways. For example, as described above, the host system, if it is not the card issuer system, can periodically transfer data to the card issuer system. Then, the stored value card is activated when a purchaser or user of the stored value card first uses it for a purchase transaction. In another example, if the purchaser or user of the stored value card uses the card before this periodic data transfer, the purchaser or user communicates with the card issuer system and activates the card. For example, this communication can be performed using a telephone communication system, or the like.

FIG. 8 shows a flowchart depicting an activation process 800, according to a further embodiment of the present invention. For example, process 800 can be performed using system 100 and a package 108, as described above. All steps in method 800 are similar to steps in process 700, except in step 810 a fund and activate message is transmitted from a purchasing system to a host system, instead of a fund and initiate message sent in step 710. In one example, a fund and activate message sent at step 810 allows for faster activation than a fund and initiate message sent at step 710, which can require an additional activation step.

In one example, the swiping of the packaging and purchase transaction allow for inventory monitoring and control of the packaged stored value cards. Thus, each time a purchase transaction completes for the stored value card, inventory in a purchase system can be automatically updated to reflect the sale of the stored value card. Also, if allowed, each time a stored value card is returned inventory can be appropriately updated as well.

Example Implementations

The present invention (i.e., system 100, processes 600, 700, and/or 800 or any part(s) or function(s) thereof) may be implemented using hardware, software or a combination thereof and may be implemented in one or more computer systems or other processing systems. However, the manipulations performed by the present invention were often referred to in terms, such as receiving or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include point of sale terminals, general purpose digital computers or similar devices.

Figure 9:
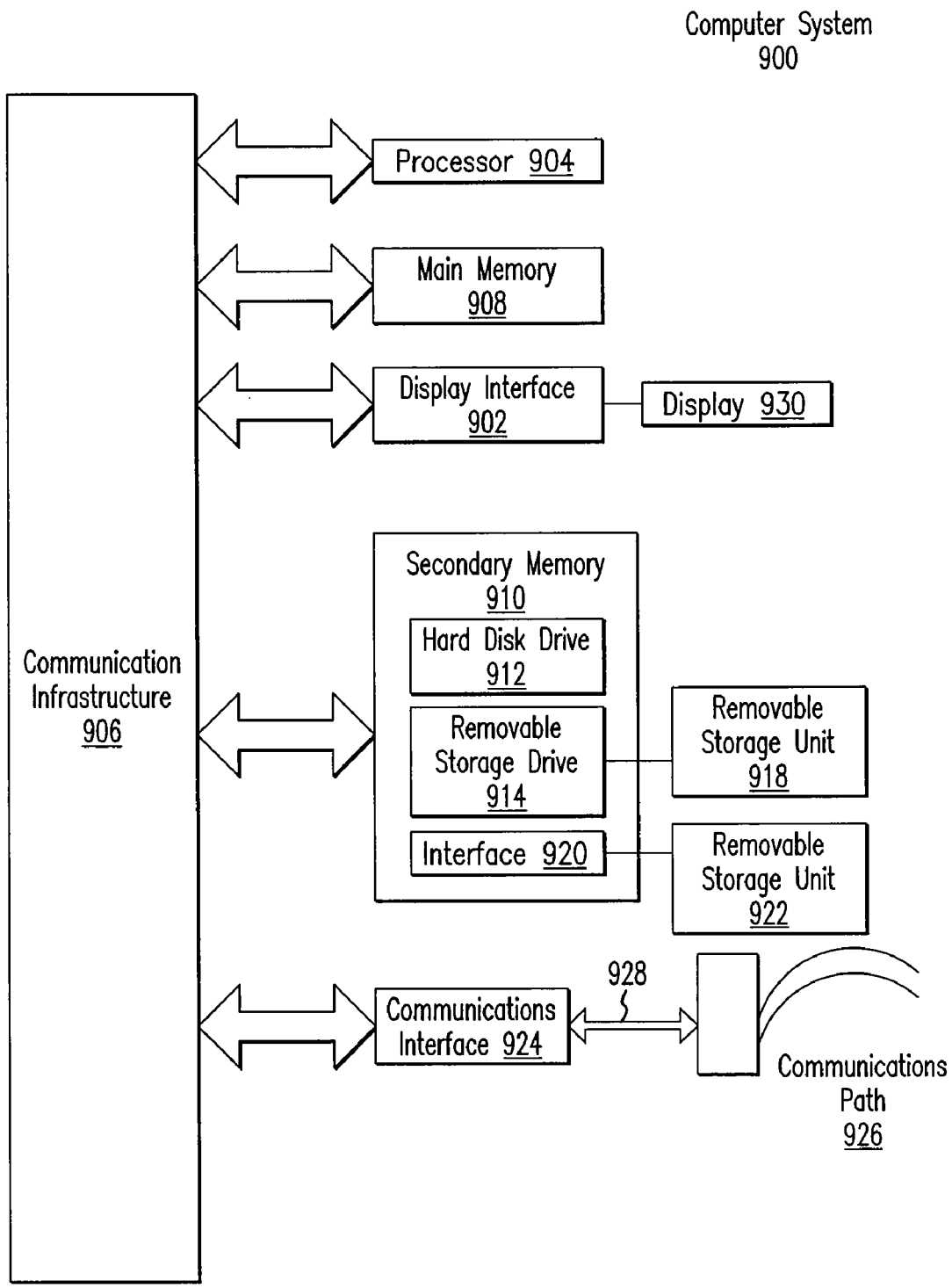
FIG. 9 is a block diagram of a sample computer system that can be used in the implementation of one or more embodiments of the present invention.

In fact, in one embodiment, the invention is directed toward one or more computer systems capable of carrying out the functionality described herein. An example of a computer system 900 is shown in FIG. 9.

The computer system 900 includes one or more processors, such as processor 904. The processor 904 is connected to a communication infrastructure 906 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on the display unit 930.

Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918 represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928 which may be electronic, electromagnetic, optical or other signals capable of being received by communications interface 924. These signals 928 are provided to communications interface 924 via a communications path (e.g., channel) 926. This channel 926 carries signals 928 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 914, a hard disk installed in hard disk drive 912, and signals 928. These computer program products provide software to computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention (e.g., packaging and activation of other transaction cards and/or use of batch activation processes). Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method for reducing the occurrence of fraud associated with the sale of stored value cards, comprising:
   (a) reading information on a package during purchase of the stored value card using a purchasing system, the information being associated with the stored value card, and the stored value card being unviewably secured within the package;
   (b) initiating communications between the purchasing system and a host system that is associated with the stored value card;
   (c) verifying authenticity of the stored value card;
   (d) completing the purchase; and
   (e) activating the stored value card after the purchase of the stored value card is completed.

2. The method of claim 1, wherein step (e) comprises: reading the stored value card to perform a purchase transaction.

3. The method of claim 1, wherein step (e) comprises:
   (i) initiating communication with the host system using a telephone;
   (ii) transmitting information from the telephone to the host system; and
   (iii) receiving confirmation from the host system that the stored value card has been activated.

4. The method of claim 1, wherein step (a) comprises reading at least one of a magnetic strip or a machine readable code as the information.

5. The method of 1, further comprising:
   (f) tracking inventory of a plurality of the packages based on step (d).

6. The method of claim 1, wherein step (c) comprises:
   (i) transmitting the information on the stored value card from the purchasing system to the host system;
   (ii) comparing the information on the card to stored information in the host system; and
   (iii) using a result of step (c)(ii) to determine whether purchase of the stored value card is authorized.

7. The method of claim 6, wherein step (c)(ii) is performed by one of the purchasing system and the host system.

8. The method of claim 1, comprising using one or more of a debit card, a prepaid card, and a telephone card as the stored value card.

9. A package, comprising:
   a body;
   a first panel coupled to a first edge of the body;
   a second panel coupled to a second edge of the body; and
   a third panel coupled to a third edge of the body,
   wherein the first and second panels are secured to each other to form a receiving area that receives a stored value card,
   wherein the third panel is secured to the first and second panels to secure the stored value card, such that the stored value card is unviewable within the package,
   wherein at least one of the body, the first panel, the second panel, and the third panel includes a readable information area that is associated with the stored value card.

10. The package according to claim 9, wherein the readable information comprises at least one of a magnetic strip or a machine readable code.

11. The package according to claim 9, wherein the readable information is affixed or printed one of lengthwise or widthwise with respect to the at least one of the body, the first panel, the second panel, or the third panel.

12. A package, comprising:
    a body;
    a first panel coupled to a first edge of the body; and
    a second panel coupled to a second edge of the body,
    wherein the first panel is secured to the body to form a receiving area for a stored value card,
    wherein the second panel is secured to the first panel to secure the stored value card, such that the stored value card is unviewably secured within the package,
    wherein at least one of the first panel, the second panel, or the body includes a readable information area that is associated with the stored value card.

13. The package according to claim 12, wherein the readable information comprises at least one of a magnetic strip or a machine readable code.

14. The package according to claim 12, wherein the readable information is affixed or printed one of lengthwise or widthwise with respect to the at least one of the first, second, or third panel.

15. A system, comprising:
    a package that unviewably secures at least one stored value card and includes an information area thereon that includes readable information associated with the at least one stored value card;
    a purchasing system that reads the readable information;
    a host system that receives the read readable information from the purchasing system;
    a comparing device that compares the read readable information to stored information stored in the host system and generates a result, the purchasing system controlling a purchase transaction of the package based on the result generated by the comparing device; and an activation device that activates the at least one stored value card only after the purchasing system has completed the purchase transaction.

16. The system of claim 15, wherein the readable information comprises at least one of a magnetic stripe or machine readable code.

17. The system of claim 15, wherein the activation device comprises:

a card issuer system that receives information from the host system based on the result of the comparing device and information from the purchasing system or another purchasing system used during a purchase transaction utilizing the at least one stored value card.

18. The system of claim 15, wherein the activation device comprises a purchaser communication portion and a card issuer communication portion.

19. A computer program product for activating a stored value card, the computer program product comprising a computer usable medium having control logic stored therein, the control logic comprising:

first computer readable program code means for reading information on a package during purchase of the stored value card using a purchasing system, the information being associated with the stored value card, and the stored value card being unviewably secured within the package; and second computer readable program code means for initiating communications between the purchasing system and a host system that is associated with the stored value card;

third computer readable program code means for verifying authenticity of the stored value card; and fourth computer readable program code means for completing the purchase;

wherein the stored value card is activated after the purchase of the stored value card is completed.

20. The computer program product of claim 19, wherein the first computer readable program code means reads at least one of a magnetic strip or a machine readable code as the information.

21. The computer program product of 19, wherein the control logic further comprises:

fifth computer readable program code means for tracking inventory of a plurality of the packages.

22. The computer program product of 19, wherein the stored value card is one or more of a debit card, a prepaid card, or a telephone card.

* * * * *